United States Patent
Dueckinghaus et al.

(10) Patent No.: US 9,732,773 B2
(45) Date of Patent: Aug. 15, 2017

(54) DRIVE SYSTEM FOR HYDRAULICALLY DRIVEN WORKING MECHANISMS OF A WORKING MACHINE

(71) Applicant: CLAAS SELBSFAHRENDE ERNTEMASCHINEN GMBH, Harsewinkel (DE)

(72) Inventors: Heinrich Dueckinghaus, Bielefeld (DE); Heinrich Schneider, Harsewinkel (DE); Dirk Schlichting, Paderborn-Dahl (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 351 days.

(21) Appl. No.: 14/488,591

(22) Filed: Sep. 17, 2014

(65) Prior Publication Data

US 2015/0082780 A1    Mar. 26, 2015

(30) Foreign Application Priority Data

Sep. 24, 2013 (DE) .......................... 10 2013 110 568

(51) Int. Cl.
| | |
|---|---|
| *F16D 31/02* | (2006.01) |
| *F15B 21/08* | (2006.01) |
| *A01D 41/127* | (2006.01) |
| *F15B 21/02* | (2006.01) |
| *F04B 1/20* | (2006.01) |
| *F04B 49/00* | (2006.01) |
| *A01D 75/18* | (2006.01) |
| *A01F 29/14* | (2006.01) |

(52) U.S. Cl.
CPC .......... *F15B 21/08* (2013.01); *A01D 41/1274* (2013.01); *A01D 75/187* (2013.01); *A01F 29/14* (2013.01); *F04B 1/2014* (2013.01); *F04B 49/002* (2013.01); *F15B 21/02* (2013.01)

(58) Field of Classification Search
CPC .. A01D 75/187; A01D 41/1274; F04B 1/2014
See application file for complete search history.

(56) References Cited

U.S. PATENT DOCUMENTS

| | | | |
|---|---|---|---|
| 3,810,715 A | * 5/1974 | Week | ........................ F04B 1/20 417/213 |
| 2012/0067037 A1 | * 3/2012 | Bohrer | ................ A01D 75/187 60/450 |

FOREIGN PATENT DOCUMENTS

EP        2 312 928        4/2011

* cited by examiner

Primary Examiner — Thomas E Lazo
Assistant Examiner — Daniel Collins
(74) Attorney, Agent, or Firm — Michael J. Striker

(57) ABSTRACT

A drive system for hydraulically driven working mechanisms of a working machine includes an axial piston pump, the pump capacity and flow direction of which is varied by changing the pivot angle of the axial piston pump. The drive system includes a hydraulic motor connected via a line to the axial piston pump and drivably connected to the working mechanisms, a control unit operated to set the pump capacity of the axial piston pump to zero and a control valve arrangement that is actuated by the control unit to actuate a limiting device such that the pivot angle of the axial piston pump can be mechanically set to zero degrees (0°).

13 Claims, 6 Drawing Sheets

DRIVE SYSTEM FOR HYDRAULICALLY DRIVEN WORKING MECHANISMS OF A WORKING MACHINE

CROSS-REFERENCE TO A RELATED APPLICATION

The invention described and claimed hereinbelow is also described in German Patent Application DE 10 2013 110 568.8, filed on Sep. 24, 2013. The German Patent Application, the subject matters of which is incorporated herein by reference, provides the basis for a claim of priority of invention under 35 U.S.C. 119(a)-(d).

BACKGROUND OF THE INVENTION

The present invention relates to a drive system for hydraulically driven working mechanisms of a working machine and to a method for operating a working system for hydraulically driven working mechanisms of a working machine.

Document EP 2 312 928 A1 makes known a drive system for an infeed conveyor of a harvesting machine. The known drive system comprises an adjustable hydraulic pump, the flow rate and flow direction of which can be adjusted by use of a double-acting hydraulic cylinder. The hydraulic cylinder is controlled by a solenoid valve via a control unit. If a foreign body is detected in the infeed conveyor, the solenoid valve is temporarily controlled by the control unit such that the flow direction is reversed. Such action prevents the hydraulic pump from rotating to a notable extent in the direction of conveyance. A substantial disadvantage thereof is that the pump capacity cannot be limited to zero, due to tolerances in the drive system.

A disadvantage resulting from the actuation of the solenoid valve is that the dynamics by which the solenoid valve triggers a quick stop in the event that a foreign body is detected are insufficient to meet the stringent requirements for operating safety in the event of a quick stop. In order to reverse the flow direction as quickly as possible, the solenoid valve is de-energized in order to quickly degenerate the magnetic field. Subsequent thereto, the solenoid valve is re-energized, thereby activating the neutral position of the hydraulic pump.

SUMMARY OF THE INVENTION

The present invention overcomes the shortcomings of known arts, such as those mentioned above.

To that end, the present invention provides a drive system of the initially described type such that, in the event of a quick stop of a working mechanism of the working machine, the axial piston pump quickly and precisely assumes the neutral position thereof.

The present invention also provides a method for operating a working machine that enables the neutral position of the axial piston pump to be quickly and precisely assumed.

According to an embodiment, the drive system comprises a control valve arrangement, which is actuated by a control unit and by which a limiting device is actuated such that the pivot angle of the axial piston pump can be mechanically set to zero degrees (0°). A rapid change of the pivot angle induces a reversal of the flow direction when the pivot angle passes zero and becomes negative. For this reason, the limiting device abruptly halts a change of the pivot angle into the negative range and holds the pivot angle in this stop position. It is thereby ensured that the axial piston pump has no pump capacity in the event of a quick stop of a working mechanism.

Advantageously, the control valve arrangement comprises a valve assembly and a first and second control valve. The use of a plurality of control valves makes it possible to not only implement a quick stop but also to reverse the hydraulic motor. The reversal can be implemented independently of a quick stop.

The valve assembly preferably further comprises a valve assembly housing, in which a delivery valve and a return valve and the limiting device are disposed.

In an advantageous development, the limiting device is adjustable such that the flow direction of the axial piston pump is reversible. As a result, the drive system can also be operated in a reversing manner.

In particular, the limiting device is controlled by the first control valve. Consequently, the limiting device can be controlled individually, which is advantageous for implementing a quick stop and the reversal of the hydraulic motor. The control carried out by the first control valve also makes it possible to easily set the limiting device in order to adapt said limiting device to the actual neutral position of the pivot angle.

The limiting device preferably comprises a piston-shaped element, at least one side of which is subjected to hydraulic pressure. In this case, the limiting device functions as a single-acting cylinder. The piston-shaped element is subjected to hydraulic pressure on one side, while the weight of the pivoting base of the axial piston pump acts on the other side. It is therefore possible to operate without additional return means in order to assume different positions that are necessary for a quick stop and for the reversal.

In addition, the second control valve actuates the delivery valve and the return valve, which control the inflow and the outflow of hydraulic oil to or from the axial piston pump, respectively. The delivery valve and the return valve may be designed as gate valves.

Advantageously, the control unit can be set up to detect an operating state of the working machine that is representative of a foreign body entering a working mechanism of the working machine or is representative of a triggering of a reversing operation of a working mechanism. In this manner it is ensured that the first control valve and the second control valve are controlled by the control unit in a coordinated manner in accordance with the operating state that sets in.

In an embodiment, the invention provides a method for operating a drive system for hydraulically driven working mechanisms of a working machine, the drive system comprising an axial piston pump, a hydraulic motor and a control unit, wherein the pump capacity and flow direction of the axial piston pump are varied by changing the pivot angle, the hydraulic motor is connected via a line to the axial piston pump and is drivably connected to the working mechanisms and the control unit is operated such that the pump capacity of the axial piston pump is set to zero.

According to the method, the presence of an operating state is detected that is representative of a foreign body entering a working mechanism of the working machine or is representative of the triggering of a reversing operation of a working mechanism. Depending on the operating state that is detected, the control unit controls an actuator system for actuating a limiting device, by which the pivot angle of the axial piston pump is mechanically set according to the operating state. In this manner, operating states are depicted that correspond to the quick stop or the reversal of the working assembly.

Advantageously, the control unit actuates a first control valve of the control valve arrangement such that the limiting device is transferred into a position in which the pivot angle of the axial piston pump is set to zero by the limiting device.

It is thereby possible to control the first control valve of the control valve arrangement upon detection of the triggering of a reversing operation such that the limiting device is transferred into a position in which the axial piston pump can be operated in a reversing manner.

In the simplest case, a control valve is provided that controls the limiting device. In this case, the piston-shaped element is acted upon with a hydraulic pressure such that the piston-shaped element extends into the interior of the housing of the axial piston pump to the extent that corresponds to the neutral position of the pivot angle. The movement of the piston-shaped element is preferably limited by a stop on or in the housing. In order to implement a reversal, the control valve is controlled such that the piston-shaped element is not acted upon with hydraulic pressure. The piston-shaped element is transferred into a position, under the effect of weight, in which the piston-shaped element does not extend into the interior of the axial piston pump. Since the neutral position of the pivot angle is not mechanically limited, the pivot angle can assume a negative value, which corresponds to the reversing operation of the axial piston pump.

In particular, upon detection of a foreign body in a working mechanism, the control unit actuates a second control valve such that the flow direction of the axial piston pump is reversed.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
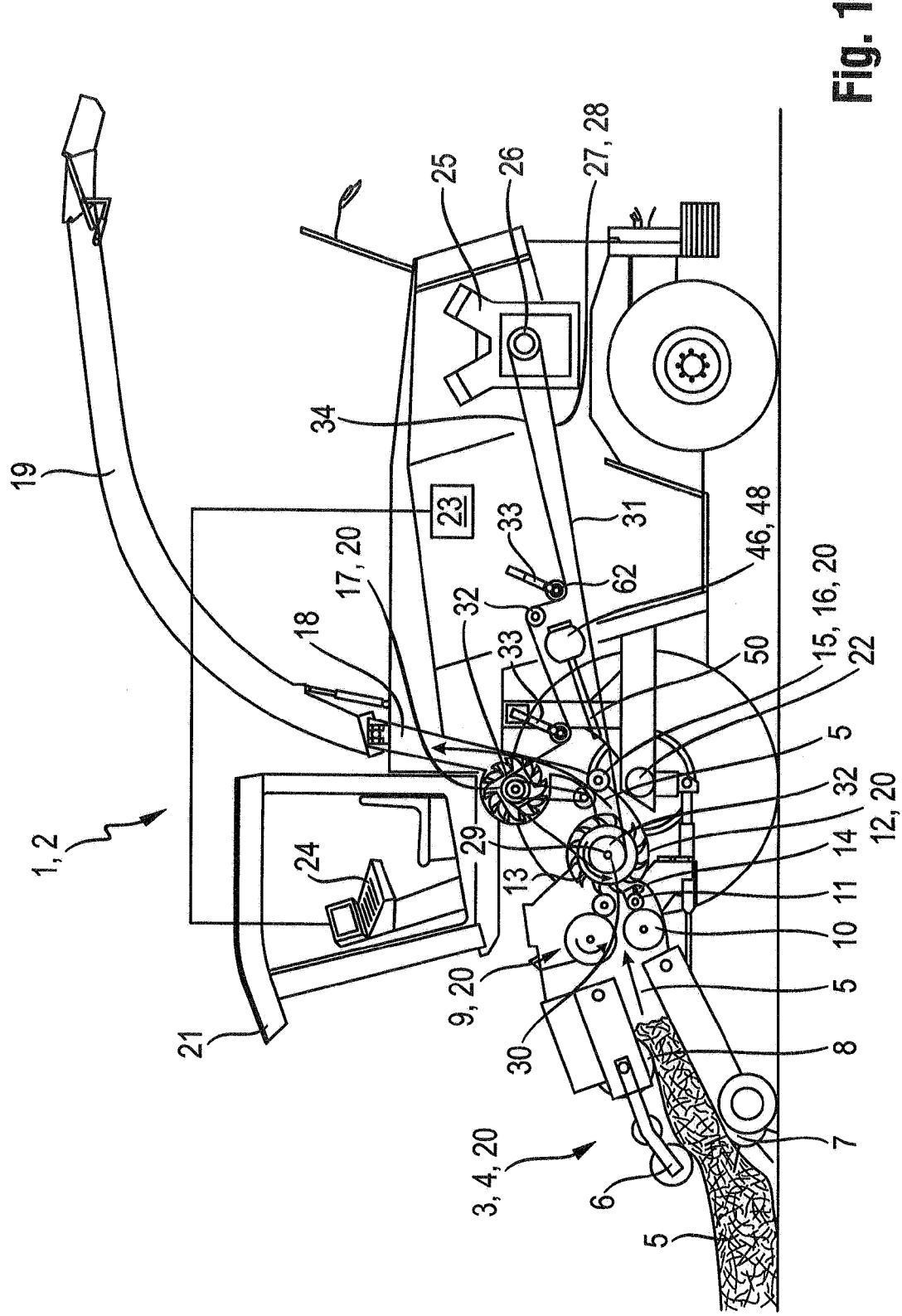
FIG. 1 shows a schematic side view of a forage harvester.

FIG. 1 shows an agricultural working machine 1 designed as a forage harvester 2, in the front region of which a front attachment 3 designed as a pick-up 4 is accommodated. Instead of a pick-up, it also is possible to use a corn header, for example. The pick-up 4 is configured such that this picks up a crop strand 5 between a hold-down device 6 and a pick-up drum 7 and, in the rear region of the pick-up 4, feeds said crop strand to a cross auger 8. The cross auger 8 transfers the crop 5 to intake conveyor mechanisms 9 disposed approximately in the center, downstream of the pick-up 4. In the exemplary embodiment shown, the intake conveyor mechanisms 9 are formed by intake rollers 10 disposed in pairs and compression rollers 11 disposed downstream thereof.

After the crop stream 5 has passed through the intake conveyor mechanisms 9, the crop stream is transferred, in the rear region of the intake conveyor mechanisms, to is a chopper drum 12. The chopper drum 12 comprises a large number of cutting blades 13 on the circumference thereof, which, in interaction with a shear bar 14, fragmentize the crop strand 5. Via the kinetic energy of the rotating chopper drum 12, the crop strand 5 exits the rear region of the chopper drum 12 at a high rate of speed and is transferred to cracker rollers 15, which are disposed in pairs. The cracker rollers 15 form a so-called rechopper 16, which can be optionally used.

After the crop strand 5 has passed through the rechopper 16, the crop strand reaches the working region of a post-accelerator 17. The post-accelerator 17 adds kinetic energy to the crop strand 13 in a manner known per se, by which the crop strand 5 is ejected out of the forage harvester 2 via a lower discharge chute 18 (which points substantially in the vertical direction) and via an upper discharge chute 19 (which is located downstream of the lower discharge chute) and is movable in a swiveling and rotating manner. In the exemplary embodiment shown, the front harvesting attachment 3, the intake conveyor mechanisms 9, the optional rechopper 16 and the post-accelerator 17 are the working mechanisms 20, according to the invention, of the agricultural working machine 1.

In addition, at least one drive engine 25 is assigned to the forage harvester 2 and a drive belt 27 is wrapped around the output-side pulley 26 of the drive engine. According to the invention, the drive belt 27 is a main drive belt 28. In the exemplary embodiment shown, the main drive belt 28 extends between the output-side pulley 26 of the drive engine 25 and a pulley 30 assigned to the drive shaft 29 of the chopper drum 12. While the so-called tight side 31 extends directly between the chopper drum 12 and the pulley 26 of the drive engine 25 and is free of further energy-tapping elements, the outputs 32 and tensioning devices 33 (described in more detail below) are disposed on the so-called slack side 34. In the exemplary embodiment shown, the pulley 30 supplying the chopper drum 12 with drive energy is located lower in the vertical direction than the pulley 26 associated with the drive engine 25. An input/output unit 24 of a control unit 23, which is used, inter alia, to control the intake conveyor mechanisms 9, is located in the driver's cab 21 of the forage harvester 2. The input/output unit 24 of the control unit 23 is designed, for example, as a keyboard and a video screen unit.

Figure 2:
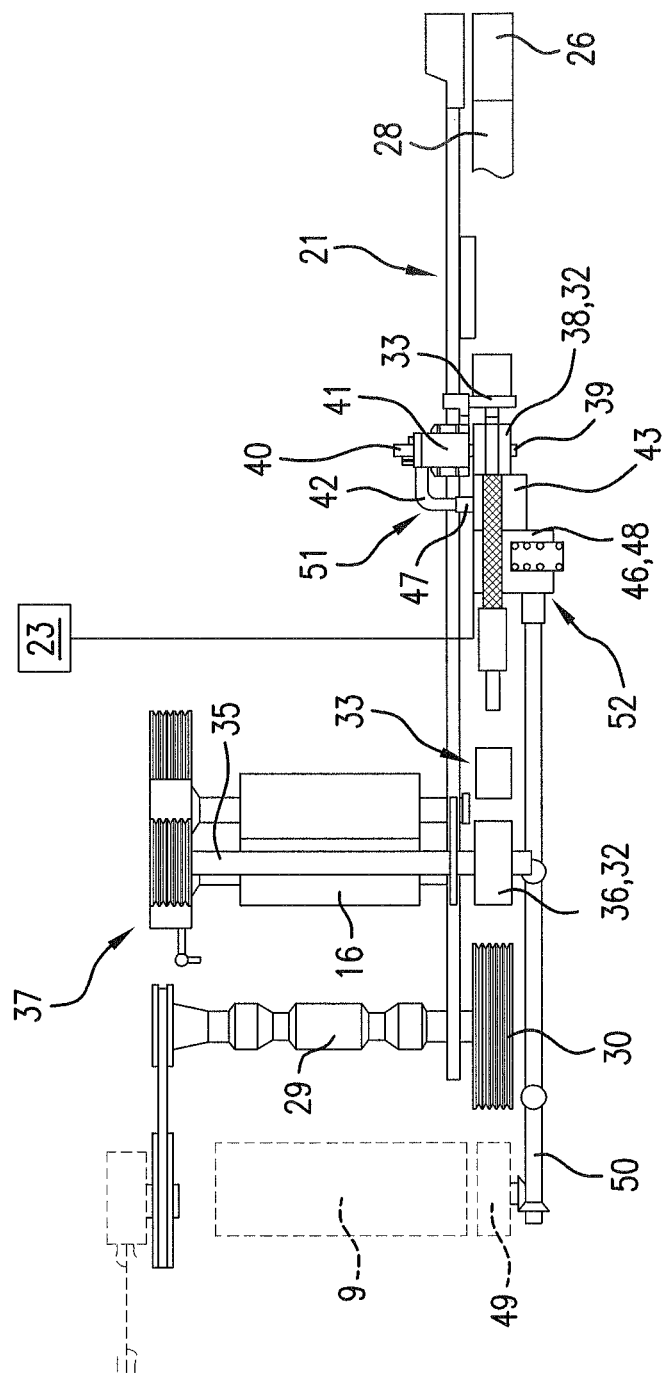
FIG. 2 shows a detailed top view of a drive system of the forage harvester.

A schematic view of a drive system is depicted in a top view in FIG. 2. A pulley 36, around which the main drive belt 28 is at least partially wrapped, is disposed in a vertical uppermost position on the post-accelerator shaft 35. In a manner known per se, the post-accelerator shaft 35 is assigned to one end of a gearbox stage 37, by which the optional rechopper 16 can be driven. In this manner, the post-accelerator 17 and the rechopper 16 can both be driven by the pulley 36, and therefore this pulley 36 is one of the outputs 32 associated with the main drive belt.

A further pulley 38 is associated with the main drive belt 28 in the vertical direction between the position of the pulley 26 associated with the drive engine 25 and the pulley 36 associated with the post-accelerator shaft 35 and in the longitudinal direction, approximately in the middle between said pulley 26 and said pulley 30. An output shaft 39 extends through this pulley 38, said output shaft being coupled at one end thereof to the drive shaft 40 of a hydraulic pump 41 designed as an axial piston pump. A pipeline system 42, as part of a hydraulic system, is dedicated to the hydraulic pump 41 on the output side. The pipeline system 42 leads, via the other end thereof, into a hydraulic motor 43, the output shaft 44 of which is coupled to the input shaft 45 of a gearbox unit 46.

In addition, a control valve arrangement 47 is integrated in the pipeline system 42 and controls an exchange of hydraulic oil flow between the hydraulic pump 41 and the hydraulic motor 43. The control valve arrangement 47 can interrupt the hydraulic oil flow between the hydraulic pump 41 and the hydraulic motor 43, thereby bringing the intake conveyor mechanisms 9 to an abrupt standstill. In a manner known per se, this function is required in conjunction with the so-called foreign body detectors since, when said foreign body detectors detect foreign bodies, the intake conveyor mechanisms 9 are stopped in a manner known per se, thereby preventing the detected foreign bodies from entering the further working mechanisms of the forage harvester 2. It lies within the scope of the invention for the control of the hydraulic oil flows to be carried out automatically, in a manner known per se, or in a targeted manner by an operator of the forage harvester 2.

The gearbox unit 46 is the drive unit 48 for driving the intake conveyor mechanisms 9, wherein a so-called transfer gearbox 49 is associated with the intake conveyor mechanisms 9 in a manner known per se. At least one universal drive shaft 50 is connected between the transfer gearbox 49 and the gearbox unit 46 in order to transfer the drive energy. The gearbox unit 46, which is the drive unit 48, is disposed at least partially in a region that is delimited in the vertical direction by the tight side 31 and by the slack side 34 of the main drive belt 28 and, also is located in the rear region of the front axle 22 depicted in FIG. 1. Given that a hydraulic unit 51 comprising the hydraulic pump 41 and the hydraulic motor 43 is dedicated to the drive unit 48 of the intake conveyor mechanisms 9, the rotational speed of the intake conveyor mechanisms 9 can be steplessly adjusted. The hydraulic unit 51 and the gearbox unit 46 form the hydromechanical gearbox unit 52. As stated above, the pulley 38 also functions as an output 32, which interacts with the main drive belt 28.

Figure 3:
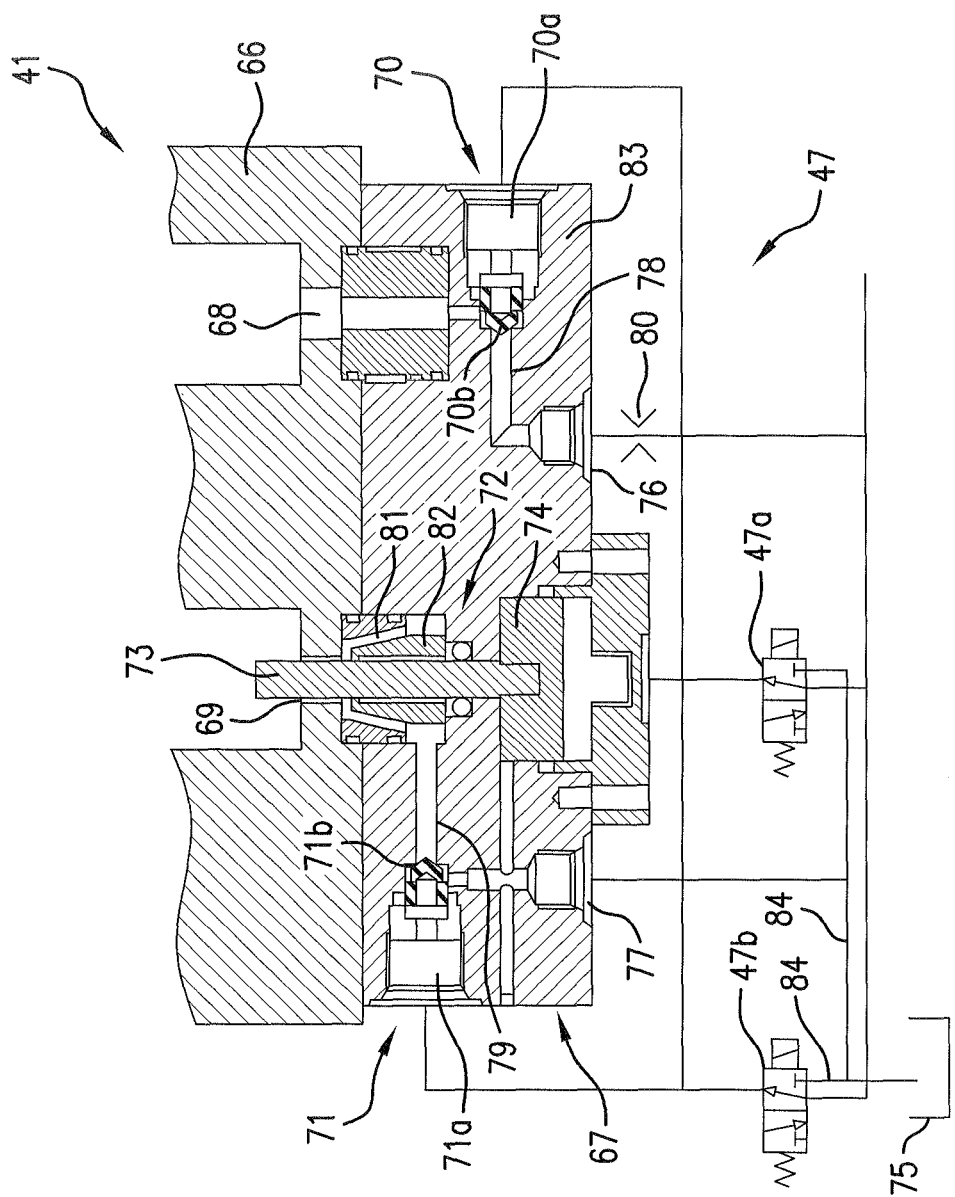
FIG. 3 shows a partial sectional view of an axial piston pump comprising a valve assembly disposed thereon.

FIG. 3 shows a partial sectional view of the hydraulic pump 41 designed as an axial piston pump, comprising a valve assembly 67 disposed thereon and schematically shows components of the control valve arrangement 47. The illustration in FIG. 3 shows only one part of a housing 66 enclosing the hydraulic pump 41, to which the valve assembly 67 disposed in a valve assembly housing 83 is connected. The pump capacity and the flow direction of the hydraulic pump 41 is varied by changing the pivot angle of said hydraulic pump, which is achieved in the case of axial piston pumps by changing the position of the sliding disk thereof. Lines of the pipeline system 42 are attached to the valve assembly 67 in order to supply the hydraulic pump 41 with hydraulic oil. The housing 66 comprises an inflow 68 and an outflow 69, to which a delivery valve 70 and a return valve 71, respectively, are assigned.

Moreover, the valve assembly 67 comprises a limiting device 72 on the side of the outlet 69, the said limiting device having a bolt 73 and a cylindrical piston 74 adjoining said bolt. The bolt 73 is guided in the axial direction in a bolt guide 82, which is part of the limiting device 72. An annular chamber 81 is formed between the bolt guide 82 and the valve assembly housing 83, which accommodates, inter alia, the delivery valve 70, the return valve 71, and the mechanical limiting device 72. In addition, the control valve arrangement 47 comprises a first control valve 47a, which is integrated into the pipeline system 42, and a second control valve 47b, each of which is connected to a tank 75 by hydraulic lines 84.

According to the illustration in FIG. 3, the delivery valves 70 and the return valve 71 are both based on the piston longitudinal slide configuration. The respective pistons 70a, 71a of the delivery valve 70 and the return valve 71 are subjected to constant hydraulic pressure during regular operation of the intake conveyor mechanisms 9. A sealing element 70b, 71b is located on the side of the delivery valve 70 and return valve 71, respectively, facing away from the piston 70a, 71a. The sealing elements can close or open line sections 78, 79, which connect the inflow 68 and the outflow 69, respectively, to an inlet 76 and outlet 77, respectively, which are provided at the valve assembly 67.

The sealing elements 70b, 71 *b* also are subjected to a pressure, but, since the surface area thereof is smaller than that of the pistons 70a, 71a, the delivery valve 70 and the return valve 71 are closed. The second control valve 47b controls the application of pressure on the pistons 70a, 71 *a* in order to hold the delivery valve 70 and the return valve 71 closed, and controls the interruption of the pressure application in order to open the delivery valve 70 and the return valve 71.

In addition, a throttle plate 80, which reduces the pressure of the hydraulic oil on the side facing away from the piston 70a of the delivery valve 70 is installed upstream of the inlet 76.

On the side of the outlet 77, the piston 74 of the limiting device 72 is subjected to a pressure by the first control valve 47a. On the side facing the housing 66 of the hydraulic pump 41, pressure present on the pump side is applied to the piston surface formed by the bolt 73 and, via the annular chamber 82, to the bolt guide 82, whereby the limiting device 72 is held in an equilibrium position, which corresponds to the neutral position of the sliding disk of the hydraulic pump 41, i.e., hydraulic oil is not pumped. This position of the bolt 73, which sets in as a result of the equilibrium of the pressure forces, is ascertained and set by a calibration procedure, which is carried out by the respective hydraulic pump 41.

In addition, not only does the first control valve 47a set the limiting device 72 in order to obtain the neutral position of the hydraulic pump 41, said first control valve is also capable of drawing the bolt 73 of the limiting device 72 inward in order to reverse the flow direction of the hydraulic pump 41 when it becomes necessary to reverse the intake conveyor mechanisms 9. To this end, the first control valve 47a is switched by the control unit 23 such that pressure is not applied to the surface of the piston 74 of the limiting device 72. The counterforce, which results from the control pressure of the reversing operation and which is applied by the pivoting base, has the effect that—in the case of a reversal—the pivot angle of the sliding disk can assume a position in which the flow direction of the hydraulic pump 41 reversed. In this situation, the actuation of the second control valve 47b remains unchanged and, if a quick stop was implemented, the second control valve 47b is actuated once more by the control unit 23 before the reversal, in order to achieve this operating situation.

The mode of operation of the drive system is as follows:

Three operating situations are basically feasible, in which the first and the second control valve 47a, 47b must be actuated by the control unit 23. The situations are the regular operation of the intake conveyor mechanisms 9, the reversal of the intake conveyor mechanisms 9 in order to eject a foreign body or eliminate a clog, and the quick stop of the intake conveyor mechanisms 9 after a foreign body is detected.

The illustration in FIG. 3 shows a situation of the drive system in which the intake conveyor mechanisms 9 are operated in a regular manner, wherein the bolt 73 of the limiting device 72 extends into the housing 66 of the hydraulic pump 41 in order to function as a zero stop when a foreign body is detected. To this end, the first control valve 47a and the second control valve 47b are actuated by the control unit 23 such that the hydraulic pump 41 is located in the normal operating mode thereof in order to drive the intake conveyor mechanisms 9. In this operating situation, the first control valve 47a is actuated in order to subject the piston 74 to pressurized hydraulic oil, which transfers the bolt 73 of the limiting device 72 into the position thereof that corresponds to the neutral position of the sliding disk of the hydraulic pump 41.

The delivery valve 70 and the return valve 71 are acted upon with a pressure on the piston side in order to hold the delivery valve 70 and the return valve 71 in the position thereof that closes the line sections 78, 79, which connect the inflow 68 and the outflow 69, respectively, to an inlet 76 and outlet 77, respectively, provided at the valve assembly 67. The hydraulic oil required therefor is provided, for example, by a constant pressure system provided on the forage harvester 2. Hydraulic oil also is fed through the inlet 76 on the side facing the sealing element 70b, the pressure of which is less than the pressure present on the piston side of the delivery valve 70, and therefore the delivery valve 70 remains closed. The return valve 71 is acted upon with a pressure on the piston side in a corresponding manner in order to also hold said return valve in a closed position.

If it becomes necessary, due to the detection of a foreign body, to immediately halt the intake conveyor mechanisms 9 in order to prevent damage thereto, namely a so-called quick stop, the second control valve 47b is actuated accordingly in order to interrupt the respective piston-side pressure application onto the delivery valve 70 and the return valve 71, whereupon the delivery valve 70 and the return valve 71 abruptly open. As a result, the hydraulic oil present at the inlet 76 can flow through the supply line 78 and the inflow 68 into the housing 66, thereby abruptly changing the pivot angle of the hydraulic pump 41 such that the hydraulic pump 41 pumps in the direction opposite to the original flow direction thereof.

In order to nevertheless prevent an unwanted reversal, the change in the pivot angle of the hydraulic pump 41 is limited by the bolt 73 extending into the housing 66 such that the pump capacity of the hydraulic pump 41 abruptly reaches a value of zero. The hydraulic oil flowing into the housing 66 through the inflow 68 causes the sliding disk of the hydraulic pump 41 in this position, in which said sliding disk is pressed against the bolt 73 on the outflow side, to be held in the neutral position thereof. The hydraulic oil, which is enclosed between the sliding disk of the hydraulic pump 41 and the housing 66 on the side of the outflow 69, flows via the annular chamber 81 and the supply line 79 adjoining said annular chamber out of the outlet 77 and returns to the tank 75.

After the quick stop of the intake conveyor mechanisms 9 is carried out, the intake conveyor mechanisms 9 are usually driven in a reversing manner in order to eject foreign bodies that were picked up. To this end, the second control valve 47b is initially actuated by the control unit 23 such that the delivery valve 70 and the return valve 71 are closed once more, which is achieved via the application of pressure on the pistons 70a, 71a. Subsequently thereto or simultaneously therewith, the first control valve 47a is actuated by the control unit 23 in order to draw the bolt 73 of the limiting device 72 inward to permit the pivot angle of the hydraulic pump 41 to assume a value less than 0°, which induces a reversal of the intake conveyor mechanisms 9.

All that is necessary for the operating situation of reversing the intake conveyor mechanisms 9 in order to eliminate a crop jam is to actuate the first control valve 47a in the above-described manner. The second control valve 47b is not actuated, and therefore the delivery valve 70 and the return valve 71 remain closed.

Figure 4:
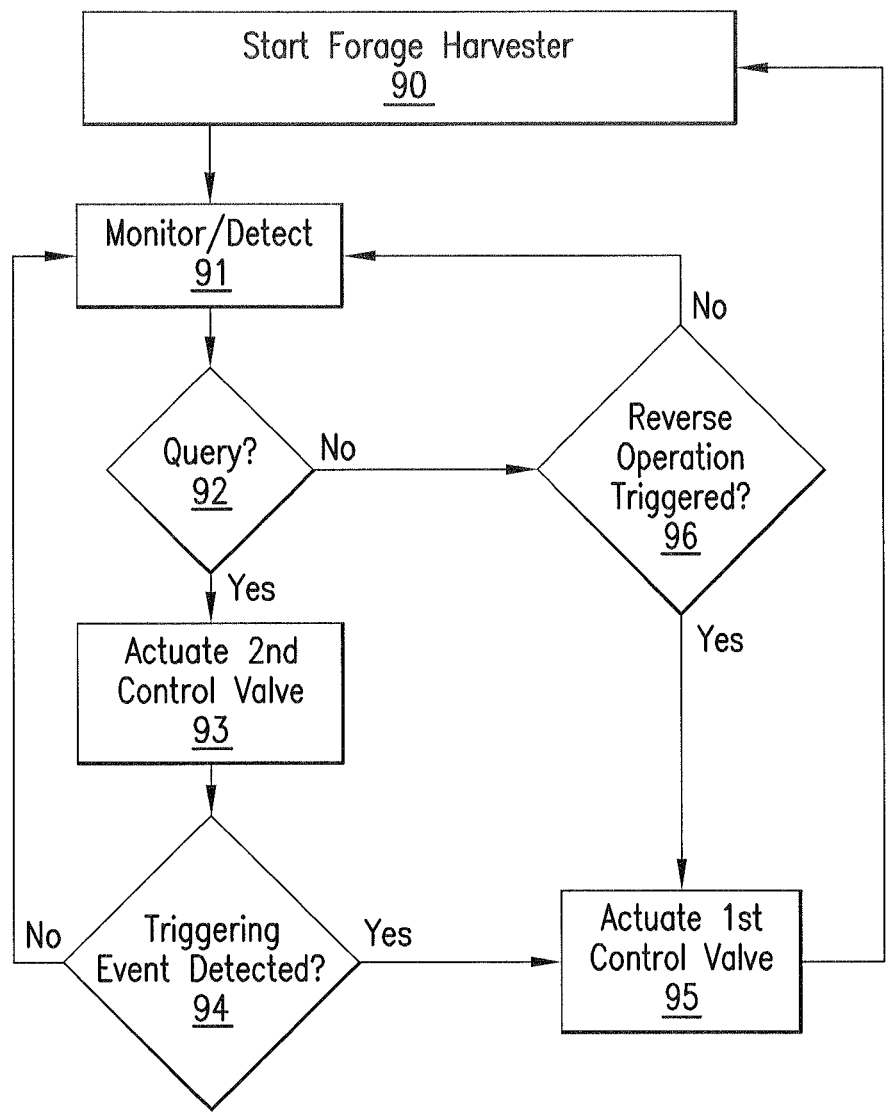
FIG. 4 shows a flow chart.

The depiction in FIG. 4 illustrates the method for operating the working machine 1 designed as a forage harvester 2, with reference to a flow chart. When the forage harvester 2 is started up in step 90, the control unit 23 actuates the first control valve 47a in order to transfer the limiting device 72 into the limiting position thereof, i.e., in which the limiting device 72 functions as a mechanical zero stop of the hydraulic pump 41. Next, in step 91, the control unit 23 begins to monitor and/or detect the presence of an operating state that is representative of a foreign body entering the intake conveyor mechanism 9 of the working machine 2 or is representative of the triggering of a reversing operation of the intake conveyor mechanism 9.

In step 92, a query is conducted to determine whether an operating state is present that is representative of a foreign body entering the intake conveyor mechanism 9. If it was detected that a foreign body entered the intake conveyor mechanism, then, in step 93, the second control valve 47b is actuated by the control unit 23. The actuation causes the delivery valve 70 and the return valve 71 to open. As described above, this triggers the quick stop of the hydraulic pump 41 and, therefore, the intake conveyor mechanism 9. In order to eject foreign objects located in the intake conveyor mechanism 9, the intake conveyor mechanism 9 is generally driven in a reversing manner, which is detected in step 94 either manually or in an automatically initiated manner. If an event triggering the reversing operation was detected by the control unit 23, the first control valve 47a is actuated in step 95 such that the limiting device 72 is transferred into a reversing position, i.e., the function of the limiting element 72 is deactivated, as described above, and therefore the hydraulic pump has a negative pump capacity, which induces a slow reversal of the intake conveyor mechanism 9.

If a foreign object was not detected in step 92, a check is carried out in step 96 to determine whether a reversing operation was triggered, which is a measure typically carried out in the event of a crop jam in the intake conveyor mechanism 9 of the forage harvester 2. If a signal is present that represents the triggering of a reversing operation of the intake conveyor mechanism 9, the first control valve 47a is actuated such that the limiting device 72 is transferred into the reversing position thereof.

Figure 5:
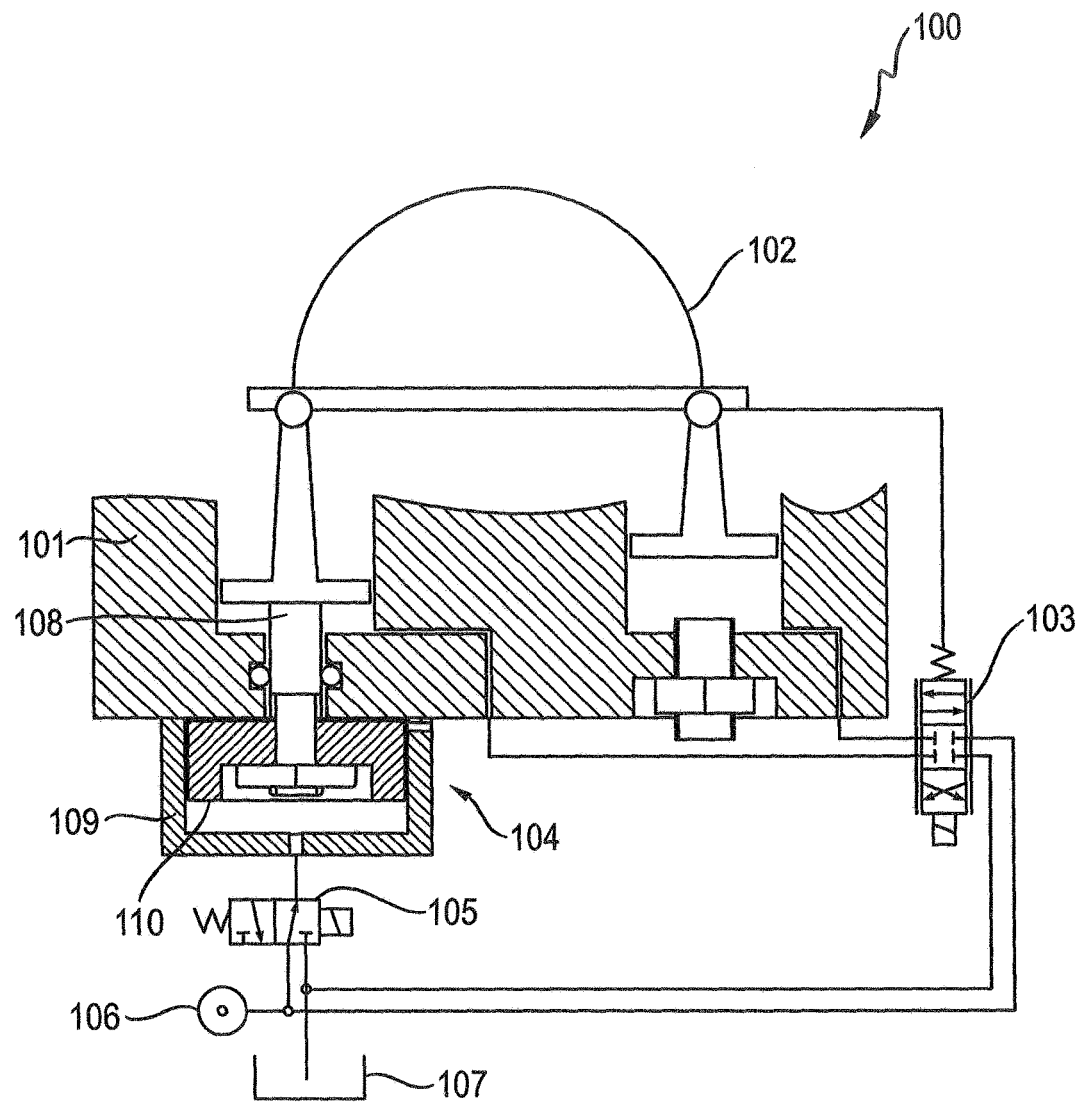
FIG. 5 shows a partial sectional view of an axial piston pump comprising a valve assembly disposed thereon, according to a second embodiment, in a first operating situation.

FIG. 5 shows a partial sectional view of a hydraulic pump 100, which is designed as an axial piston pump and comprises a control valve assigned thereto and a limiting device according to a second embodiment. This design is simplified as compared to the first exemplary embodiment. The hydraulic pump 100 is disposed in a housing 101, which is shown only partially in the sectional view. A pivoting base 102 is located in the interior of the housing 101, the deflection of which induces a change in the pivot angle of the hydraulic pump 100. The pivot angle of the pivoting base 102 can be adjusted by a solenoid valve 103. A limiting device 104, which can be actuated by a control valve 105, is disposed on the housing 101. The limiting device 104 comprises a bolt 108, which is disposed in an enclosure 109, which can be flange-connected to the housing 101. The bolt 108 is supported so as to be displaceable relative to the enclosure 109 and enters the interior of the hydraulic pump 100 through an opening in the housing 101 of the hydraulic pump. A base element 110 is disposed on the bolt 108, wherein the base element has a larger base surface than the bolt 108. The bolt 108 is connected to the base element 110 by a screw connection.

A pressure source 106 applies hydraulic pressure to the solenoid valve 103 and the control valve 105. In addition, a tank 107 is provided, to which the hydraulic pump 100 is connected via lines. FIG. 5 shows an operating situation of the hydraulic pump 100, in which the hydraulic pump 100 does not pump hydraulic oil, due to a quick stop. To this end, the solenoid valve 103 is de-energized, and therefore the pivoting base 102 strives to assume a negative pivot angle. The movement of the pivoting base 102 is limited by a piston 108 extending into the housing 101 of the hydraulic pump 100, wherein said piston is part of the limiting device. The control valve 105 is actuated in this operating situation such that the bolt 108 is acted upon with hydraulic pressure on the side thereof opposite the housing 101, wherein the hydraulic pressure is provided by the pressure source 106. In this manner, the bolt 108 is transferred into a position that corresponds to the zero stop of the hydraulic pump 100.

Figure 6:
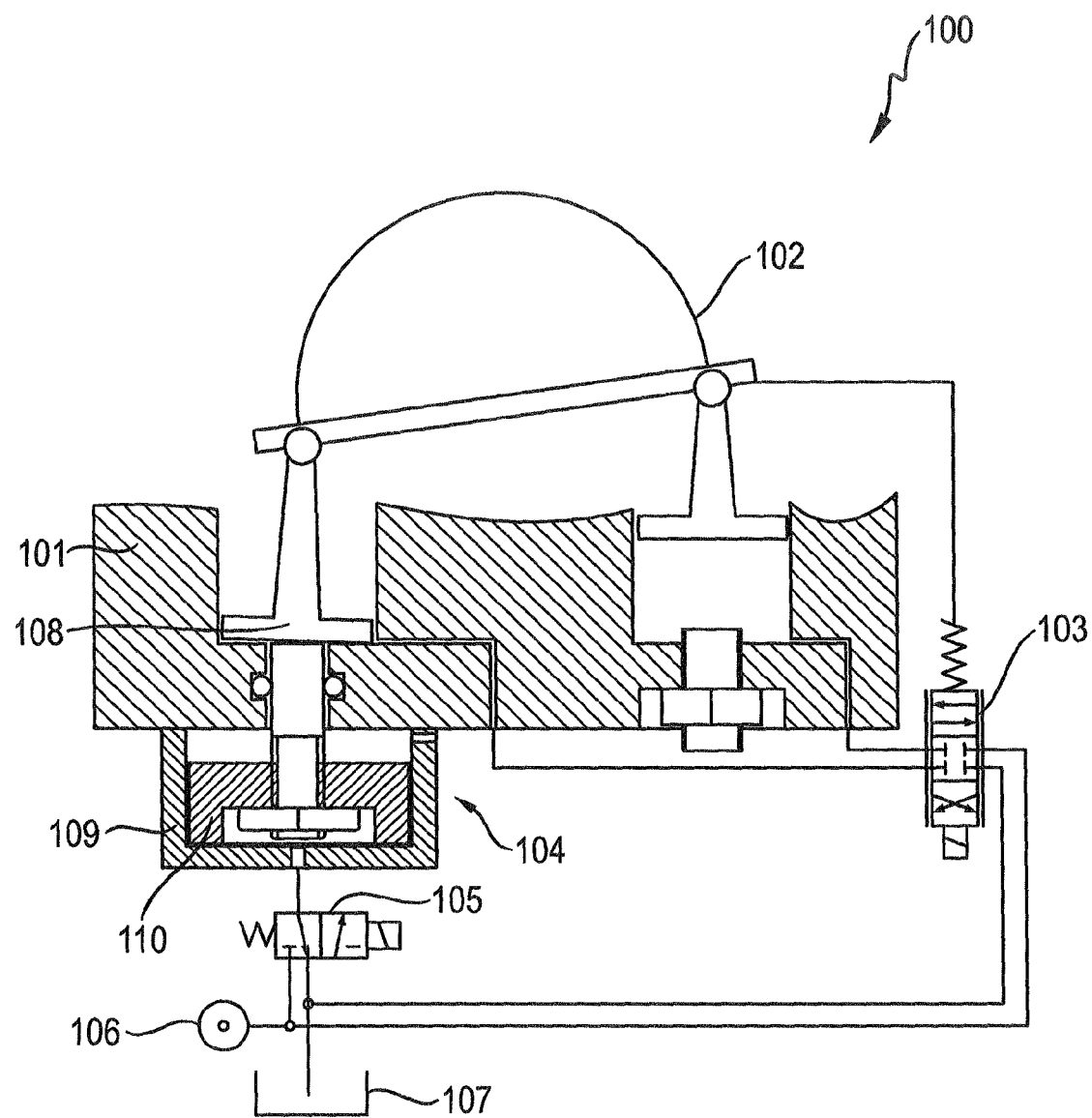
FIG. 6 shows a partial sectional view of an axial piston pump comprising a valve assembly disposed thereon, according to a second embodiment, in a second operating situation.

FIG. 6 shows a partial sectional view of a hydraulic pump 100, which is designed as an axial piston pump and comprises a control valve 105 assigned thereto and comprises a limiting device 104 according to the second embodiment, in a second operating situation. The operating situation that is illustrated shows the hydraulic pump 100 during reversal. The solenoid valve 103 is de-energized, as is the case with the quick stop. As a result, the pivoting base 102 strives to assume a negative pivot angle due to the weight distribution thereof. In order to permit the pivoting base 102 to move beyond the neutral position thereof, the control valve 105 is actuated such that the hydraulic oil in the enclosure 109, with which the bolt 108 is acted upon, can flow into the tank 107. The bolt 108 is pressed out of the interior of the housing 101 by the weight of the pivoting base 102 and the absence of the counter-pressure. Due to the absence of the mechanical stop in the interior of the housing 101 of the hydraulic pump 100, the pivoting base assumes a negative pivot angle.

LIST OF REFERENCE SIGNS 1 working machine
2 forage harvester
3 front attachment
4 pick-up
5 crop strand
6 hold-down device
7 pick-up drum
8 cross auger
9 intake conveyor mechanisms
10 feed roller
11 compression roller
12 chopper drum
13 cutting blade
14 shear bar
15 cracker roller
16 rechopper
17 post-accelerator
18 lower discharge chute
19 upper discharge chute
20 working mechanism
21 cab
22 front axle
23 control unit
24 input/output unit
25 drive engine
26 pulley
27 drive belt
28 main drive belt
29 drive shaft
30 pulley
31 tight side
32 output
33 tensioning device
34 slack side
35 drive shaft
36 pulley
37 gearbox stage
38 pulley
39 output shaft
40 drive shaft
41 hydraulic pump
42 pipeline system
43 hydraulic motor
44 output shaft
45 input shaft
46 gearbox unit
47 control valve assembly
47 first control valve
47b second control valve
48 drive unit
49 transfer gearbox
50 universal drive shaft
51 hydraulic unit
52 gearbox unit
66 housing
67 valve assembly
68 inflow
69 outflow
70 delivery valve
70a piston
70b sealing element
71 return valve
71a piston
71b sealing element
72 limiting device
73 bolt
74 piston
75 tank
76 inlet
77 outlet
78 line section
79 line section 80 throttle plate
81 annular chamber
82 bolt guide
83 valve assembly housing
84 hydraulic line
90 step
91 step
92 step
93 step
94 step
95 step
96 step
97 step
100 hydraulic pump
101 housing
102 pivoting base
103 solenoid valve
104 limiting device
105 control valve
106 pressure source
107 tank
108 bolt
109 enclosure
110 base element

What is claimed is:

1. A drive system for hydraulically driven working mechanisms of a working machine, comprising:
an axial piston pump having a pump capacity and flow direction that is varied by changing a pivot angle of the axial piston pump;
a hydraulic motor connected via a line to the axial piston pump and drivably connected to the driven working mechanisms;
a control unit that is operated to set the pump capacity of the axial piston pump to zero via actuation of a solenoid valve; and
an actuator system that is actuated by the control unit to actuate a limiting device to enable mechanically setting the pivot angle of the axial piston pump to zero degrees)(0°);
wherein the actuator system is a control valve arrangement that comprises a valve assembly and a first and a second control valve; and
wherein the limiting device comprises a piston-shaped element, at least one side of which is acted upon with hydraulic pressure.

2. The drive system according to claim 1, wherein the limiting device is integrated into the axial piston pump.

3. The drive system according to claim 1, wherein the valve assembly comprises a valve assembly housing, in which a delivery valve and a return valve and the limiting device are disposed.

4. The drive system according to claim 1, wherein the limiting device is actuated by the first control valve.

5. The drive system according to claim 1, wherein the second control valve actuates a delivery valve and a return valve, which control the inflow and the outflow of hydraulic oil to or from the axial piston pump, respectively.

6. The drive system according to claim 1, wherein the limiting device is displaced such that the flow direction of the axial piston pump can be reversed.

7. The drive system according to claim 1, wherein the control unit is set up to detect an operating state of the working machine that is representative of a foreign body entering the working mechanism of the working machine or is representative of a triggering of a reversing operation of a working mechanism.

8. A method for operating a drive system for hydraulically driven working mechanisms of a working machine, comprising axial piston pump having a pump capacity and flow direction which are varied by changing a pivot angle of the axial piston pump, a hydraulic motor connected via a line to the axial piston pump and drivably connected to the working mechanisms, an actuator system embodying a control valve arrangement that comprises a valve assembly and a first and a second control valve and a control unit operatable to set a pump capacity of the axial piston pump to zero, comprising steps of:
detecting a presence of an operating state representative of a foreign body entering a working mechanism of the working machine or of a triggering of a reversing operation of a working mechanism; and
actuating the actuator system embodying the control valve arrangement, by the control unit, to control a limiting device to mechanically set a pivot angle of the axial piston pump, depending on the operating state that is detected;
wherein the limiting device comprises a piston-shaped element, at least one side of which is acted upon with hydraulic pressure in the step of actuating.

9. The method according to claim 8, wherein the step of actuating includes the control unit actuating the first control valve of the control valve assembly to transfer the limiting device into a position in which the pivot angle of the axial piston pump is set to zero by the limiting device.

10. The method according to claim 9, wherein, upon detection of the triggering of a reversing operation, the first control valve of the control valve assembly is actuated such that the limiting device is transferred into a position in which the axial piston pump is operated in a reversing manner.

11. The method according to claim 9, wherein, upon detection of a foreign body in a working mechanism, the control unit actuates a second control valve such that the flow direction of the axial piston pump is reversed.

12. A drive system for hydraulically driven working mechanisms of a working machine, comprising:
an axial piston pump having a pump capacity and flow direction that is varied by changing a pivot angle of the axial piston pump;
a hydraulic motor connected via a line to the axial piston pump and drivably connected to the driven working mechanisms;
a control unit that is operated to set the pump capacity of the axial piston pump to zero via actuation of a solenoid valve; and
an actuator system that is actuated by the control unit to actuate a limiting device to enable mechanically setting the pivot angle of the axial piston pump to zero degrees)(0°);
wherein the actuator system is a control valve arrangement comprising a valve assembly and a first and a second control valve.

13. A method for operating a drive system for hydraulically driven working mechanisms of a working machine, comprising axial piston pump having a pump capacity and flow direction which are varied by changing a pivot angle of the axial piston pump, a hydraulic motor connected via a line to the axial piston pump and drivably connected to the working mechanisms, an actuator system embodying a control valve arrangement that comprises a valve assembly and a first and a second control valve and a control unit operatable to set a pump capacity of the axial piston pump to zero, comprising steps of:

detecting a presence of an operating state representative of a foreign body entering a working mechanism of the working machine or of a triggering of a reversing operation of a working mechanism; and actuating the actuator system embodying the control valve arrangement, by the control unit, to control a limiting device to mechanically set a pivot angle of the axial piston pump, depending on the operating state that is detected.

* * * * *